(12) United States Patent
Eickhoff

(10) Patent No.: US 8,048,576 B2
(45) Date of Patent: Nov. 1, 2011

(54) POWER GENERATOR SHUT-OFF VALVE

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1071 days.

(21) Appl. No.: 11/351,175

(22) Filed: Feb. 9, 2006

(65) Prior Publication Data
US 2007/0184312 A1    Aug. 9, 2007

Related U.S. Application Data

(60) Provisional application No. 60/698,457, filed on Jul. 12, 2005, provisional application No. 60/757,823, filed on Jan. 10, 2006.

(51) Int. Cl.
*H01M 8/06* (2006.01)
*B01J 8/04* (2006.01)

(52) U.S. Cl. ........ 429/421; 429/414; 429/505; 429/512; 429/515

(58) Field of Classification Search ........................ None
See application file for complete search history.

(56) References Cited

U.S. PATENT DOCUMENTS

| | | | |
|---|---|---|---|
| 3,649,360 A | 3/1972 | Bloomfield et al. | |
| 4,155,712 A | 5/1979 | Taschek | |
| 4,261,955 A | 4/1981 | Bailey, Jr. et al. | |
| 4,614,204 A * | 9/1986 | Dolejs ...................... | 137/625.11 |
| 5,346,777 A | 9/1994 | Namba et al. | |
| 5,372,617 A | 12/1994 | Kerrebrock et al. | |
| 5,458,989 A * | 10/1995 | Dodge ............................ | 429/31 |
| 5,549,983 A | 8/1996 | Yamanis | |
| 5,759,712 A | 6/1998 | Hockaday | |
| 5,853,910 A | 12/1998 | Tomioka et al. | |
| 5,914,200 A | 6/1999 | Schabert et al. | |
| 6,093,501 A | 7/2000 | Werth | |
| 6,395,414 B1 * | 5/2002 | Clingerman et al. ........... | 429/17 |
| 6,432,566 B1 | 8/2002 | Condit et al. | |
| 6,492,044 B1 * | 12/2002 | Walsh ............................. | 429/13 |
| 6,558,832 B1 | 5/2003 | Bruck et al. | |

(Continued)

FOREIGN PATENT DOCUMENTS

DE       10050554       4/2002

(Continued)

OTHER PUBLICATIONS

Pasaogullari, Ugur , "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

(Continued)

*Primary Examiner* — Keith Walker
(74) *Attorney, Agent, or Firm* — Schwegman, Lundberg & Woessner P.A.

(57) ABSTRACT

A power generator has a hydrogen producing fuel and a fuel cell having a proton exchange membrane separating the hydrogen producing fuel from ambient. A valve is disposed between the fuel cell and ambient such that water is controllably prevented from entering or leaving the fuel cell by actuation of the valve. In one embodiment, multiple fuel cells are arranged in a circle around the fuel, and the valve is a rotatable ring shaped gate valve having multiple openings corresponding to the fuel cells.

8 Claims, 6 Drawing Sheets

U.S. PATENT DOCUMENTS

| | | | |
|---|---|---|---|
| 6,576,358 | B2 | 6/2003 | Gebhardt et al. |
| 6,582,842 | B1 * | 6/2003 | King ............................... 429/19 |
| 6,844,100 | B2 * | 1/2005 | Bourgeois et al. ............. 429/38 |
| 6,979,508 | B2 * | 12/2005 | Gurin et al. ..................... 429/25 |
| 7,393,369 | B2 | 7/2008 | Shurtleff |
| 7,727,655 | B2 | 6/2010 | Eickhoff |
| 2002/0064698 | A1 | 5/2002 | Ren |
| 2002/0150804 | A1 | 10/2002 | Srinivasan et al. |
| 2002/0182459 | A1 | 12/2002 | Hockaday et al. |
| 2003/0104267 | A1 | 6/2003 | Haridoss et al. |
| 2003/0228252 | A1 | 12/2003 | Shurtleff |
| 2004/0052723 | A1 | 3/2004 | Jorgensen |
| 2004/0062978 | A1 | 4/2004 | Yazici |
| 2004/0161646 | A1 * | 8/2004 | Rezachek et al. ............... 429/19 |
| 2004/0202903 | A1 * | 10/2004 | deVos et al. ..................... 429/19 |
| 2005/0136300 | A1 | 6/2005 | Dyer |
| 2005/0142424 | A1 | 6/2005 | Homma et al. |
| 2005/0158595 | A1 | 7/2005 | Marsh et al. |
| 2005/0181245 | A1 | 8/2005 | Bonne et al. |
| 2005/0233181 | A1 | 10/2005 | Wariishi et al. |
| 2005/0249986 | A1 | 11/2005 | McLean |
| 2006/0134487 | A1 | 6/2006 | Wang et al. |
| 2006/0234093 | A1 * | 10/2006 | Schaefer et al. ............... 429/13 |
| 2007/0160887 | A1 | 7/2007 | Eickhoff |
| 2007/0298312 | A1 | 12/2007 | Koehler et al. |

FOREIGN PATENT DOCUMENTS

| | | |
|---|---|---|
| DE | 10050554 A1 | 4/2002 |
| EP | 1469545 | 10/2004 |
| EP | 1469545 A2 | 10/2004 |
| EP | 1601037 | 11/2005 |
| EP | 1601037 A1 | 11/2005 |
| JP | 2004247091 | 8/2004 |
| JP | 04-247091 | 9/2004 |
| JP | 2004-247091 | 9/2004 |
| WO | WO-0109519 | 2/2001 |
| WO | WO-0145189 | 6/2001 |
| WO | WO-0145189 A1 | 6/2001 |
| WO | WO-0109519 A1 | 8/2001 |
| WO | WO-2004075375 A2 | 9/2004 |
| WO | WO-2004093231 | 10/2004 |
| WO | WO-2004093231 A2 | 10/2004 |
| WO | WO-2005/004273 A2 | 1/2005 |
| WO | WO-2006113469 A1 | 10/2006 |

OTHER PUBLICATIONS

"Application No. 200680048771.1, Office Action mailed Aug. 28, 2009", 2 pgs.

"Application Serial No. 06826322.7, Office Action Received mailed Apr. 27, 2009", 4 pgs.

"Application Serial No. 06826322.7, Response filed Oct. 27, 2009 to Communication mailed Apr. 27, 2009", 2 pgs.

"U.S. Appl. No. 11/257,738, Non-Final Office Action mailed Dec. 9, 2009", 13.

"U.S. Appl. No. 11/257,738, Response to Restriction Requirements mailed Nov. 6, 2009", 6 pgs.

"U.S. Appl. No. 11/257,872, Response filed Nov. 24, 2009 to Final Office Action mailed Oct. 8, 2009", 14 pgs.

"U.S. Appl. No. 11/353,571, Response filed Nov. 19, 2009 to Non Final Office Action mailed Aug. 19, 2009", 8 pgs.

"U.S. Appl. No. 11/257,872, Final Office Action mailed Oct. 18, 2009", 20 Pgs.

"Chinese Application No. 200680048951.X, First Action mailed Sep. 4, 2009", (w/ English Translation), 14 pgs.

"European Application Serial No. 07717606.3, Response filed Jun. 2, 2009 to Communication mailed Dec. 5, 2008", 2 pgs.

"International Application Serial No. PCT/US2006/040984, International Search Report mailed Oct. 25, 2007", 6 pgs.

"International Application Serial No. PCT/US2006/040984, Written Opinion mailed Oct. 25, 2007", 12 pgs.

"International Application Serial No. PCT/US2007/062021, International Search Report mailed Sep. 4, 2007", 5 pgs.

"International Application Serial No. PCT/US2007/062021, Written Opinion mailed Sep. 4, 2007", 9 pgs.

"Application Serial No. 06826323.5 , Office Action Received mailed Jul. 21, 2009", 3.

"U.S. Appl. No. 11/257,738 , Restriction Requirement mailed Oct. 6, 2009", 6 Pgs.

"U.S. Appl. No. 11/257,872, Non Final Office Action mailed Apr. 24, 2009", 18 pgs.

"U.S. Appl. No. 11/257,872, Response filed Jul. 24, 2009 to Non Final Office Action maield Apr. 24, 2009", 14 pgs.

"U.S. Appl. No. 11/353,571, Non-Final Office Action mailed Aug. 19, 2009", 16 Pgs.

"U.S. Appl. No. 11/592,692, Preliminary Amendment filed Nov. 3, 2006", 3 pgs.

07717606.3, "European Application Serial No. 07717606.3 Office Action Mailed Dec. 5, 2008", 22.

"U.S. Appl. No. 11/257,738, Response filed Mar. 9, 2010 to Non-Final Office Action mailed Dec. 9, 2009", 7 pgs.

"U.S. Appl. No. 11/257,872, Notice of Allowance mailed Jan. 20, 2010", 7 pgs.

"U.S. Appl. No. 11/353,571, Non-Final Office Action mailed Feb. 26, 2010", 11 pgs.

"U.S. Appl. No. 11/592,692, Restriction Requirement mailed Mar. 31, 2010", 6 pgs.

"Chinese Application No. 200680048951.X, Response filed Jan. 12, 2010 to First Office Action mailed Sep. 4, 2009", (w/ English Translation of Amended Claims), 8 pgs.

"European Application Serial No. 06786891.9, Office Action mailed Feb. 25, 2010", 2 pgs.

"European Application Serial No. EP06826323.5, Response filed Nov. 26, 2009 to Office Action dated Jul. 21, 2009", 10 pgs.

"U.S. Appl. No. 11/257,738, Notice of Allowance mailed Jun. 1, 2010", 9 pages.

"U.S. Appl. No. 11/257,738, Notice of Allowance mailed Jun. 1, 2010", 8 pgs.

"U.S. Appl. No. 11/353,571, Non-Final Office Action mailed May 13, 2010", 12 pages.

"U.S. Appl. No. 11/353,571, Preliminary Amendment filed May 21, 2009", 6 pgs.

"U.S. Appl. No. 11/353,571, Response filed May 14, 2010 to Non Final Office Action mailed May 13, 2010", 15 pgs.

"Chinese Application Serial No. 200680033217.6, Office Action mailed Apr. 15, 2010", 4 Pgs.

"U.S. Appl. No. 11/343,657, Advisory Action mailed Mar. 15, 2010", 5 pgs.

"U.S. Appl. No. 11/343,657, Examiner Interview Summary mailed Jul. 31, 2009", 1 pg.

"U.S. Appl. No. 11/343,657, Final Office Action mailed Jan. 6, 2010", 13 pgs.

"U.S. Appl. No. 11/343,657, Non Final Office Action mailed May 14, 2010", 12 pgs.

"U.S. Appl. No. 11/343,657, Non-Final Office Action mailed Jul. 31, 2009", 19 pgs.

"U.S. Appl. No. 11/343,657, Response filed Mar. 3, 2010 to Final Office Action mailed Jan. 6, 2010", 10 pgs.

"U.S. Appl. No. 11/343,657, Response filed Mar. 22, 2010 to Advisory Action mailed Mar. 15, 2010", 9 pgs.

"U.S. Appl. No. 11/343,657, Response filed Aug. 5, 2010 to Non Final Office Action mailed May 14, 2010", 10 pgs.

"U.S. Appl. No. 11/343,657, Response filed Oct. 29, 2009 to Non Final Office Action mailed Jul. 31, 2009", 12 pgs.

"U.S. Appl. No. 11/353,571, Response filed Aug. 5, 2010 to Final Office Action mailed Jul. 29, 2010", 9 pgs.

"U.S. Appl. No. 11/451,165, Amendment and Response filed Apr. 22, 2009 to Non-Final Office Action mailed Jan. 22, 2009", 11 pgs.

"U.S. Appl. No. 11/451,165, Amendment and Response filed Oct. 16, 2009 to Non-Final Office Action mailed Jul. 16, 2009", 10 pgs.

"U.S. Appl. No. 11/451,165, Amendment and Response filed Oct. 29, 2008 to Non-Final Office Action mailed Jul. 29, 2008", 10 pgs.

"U.S. Appl. No. 11/451,165, Non-Final Office Action mailed Jan. 22, 2009", 13 pgs.

"U.S. Appl. No. 11/451,165, Non-Final Office Action mailed Jul. 16, 2009", 14 pgs.

"U.S. Appl. No. 11/451,165, Non-Final Office Action mailed Jul. 29, 2008", 9 pgs.

"U.S. Appl. No. 11/451,165, Notice of Allowance mailed Jan. 14, 2010", 8 pgs.

"U.S. Appl. No. 11/451,165, Preliminary Amendment mailed Jul. 11, 2006", 7 pgs.

"U.S. Appl. No. 11/592,692, Non-Final Office Action mailed Jul. 23, 2010", 9 pgs.

"U.S. Appl. No. 11/592,692, Response filed Apr. 28, 2010 to Restriction Requirement mailed Mar. 31, 2010", 7 pgs.

"U.S. Appl. No. 11/343,657, Non-Final Office Action mailed May 14, 2010", 13 pgs.

"U.S. Appl. No. 11/353,571, Final Office Action mailed Jul. 29, 2010", 13 pgs.

"Chinese Application No. 200680048771.1, Response filed Jan. 12, 2010 to Office Action dated Aug. 28, 2009", (w/ English Translation), 10 pgs.

"Chinese Application Serial No. 200680033217.6, Response filed Aug. 30, 2010 to Office Action mailed Apr. 15, 2010", (w/ English Translation), 8 pgs.

"Chinese Application Serial No. 200680048951.X , Office Action mailed Sep. 26, 2010", 3 Pgs.

"Chinese Application Serial No. 200680048951.X, Office Action mailed Jun. 9, 2010", 3 Pgs.

"Chinese Application Serial No. 200680048951.X, Response filed Aug. 20, 2010 to Office Action dated Jun. 9, 2010", (w/ English Translation of Amended Claims), 24 pgs.

"Chinese Application Serial No. 200780012846.5, Office Action mailed Apr. 27, 2010", 6 Pgs.

"Chinese Application Serial No. 200780012846.5, Response filed Sep. 6, 2010 to Office Action mailed Apr. 27, 2010", (w/ English Translation of Pending Claims), 8 pgs.

"European Application Serial No. 06786891.9, Response filed Jun. 23, 2010 to Office Action mailed Feb. 25, 2010", 7 pgs.

"European Application Serial No. 06826322.7, Office Action mailed Nov. 4, 2010", 4 Pgs.

"International Application Serial No. PCT/US2006/040983, International Search Report mailed Mar. 9, 2007", 3 pgs.

"International Application Serial No. PCT/US2006/040983, Written Opinion mailed Mar. 9, 2007", 7 pgs.

Epstein, Alan H., "Millimeter-Scale, MEMS Gas Turbine Engines", Proceedings of ASME Turbo Expo 2003, Power for Land, Sea, and Air, Jun. 16-19, 2003, Atlanta, Georgia, USA, (2003), 1-28.

Holmes, Andrew S., et al., "Axial-Flux Permanent Magnet Machines for Micropower Generation", Journal of Microelectromechanical Systems, vol. 14, No. 1., (2005), 54-62.

"U.S. Appl. No. 11/343,657, Final Office Action mailed Apr. 16, 2011", 15 pgs.

"Capstone Micro Turbine Product Sheet", [Online]. Retrieved from the Internet: <URL: http://www.enedis.com.ar/documents/es/gendis_esp_60_C.pdf>, (2010), 1 pg.

"Chinese Application Serial No. 200680048951.X, Response filed Dec. 11, 2010 to Office Action dated Sep. 26, 2010", (w/ English Translation of Amended Claims), 13 pgs.

"European Application Serial No. 06826322, Response filed Feb. 16, 2011 to Office Action dated Nov. 4, 2010", 8 pgs.

"Microturbine", [Online] Retrieved from the Internet: <URL: http://www.daviddarling.info/encyclopedia/M/AE_microturbine.html, (2007), 2 pgs.

"Military Microturbine-powered Devices", [Online]. Retrieved from the Internet: <URL: http://www.growthconsulting.frost.com/web/images.nsf/0/9A7A06C4980C1AB5652573AE002F1765/$File/TI%20Alert.htm 2010>, (2010), 2 pgs.

Decuypere, et al., "Micro Turbines from the Standpoint of Potential Users", Micro Gas Turbines, (2005), 15-1-15-14.

"U.S. Appl. No. 11/353,571, Notice of Allowance mailed Jun. 2, 2011", 9 pgs.

"U.S. Appl. No. 11/343,657, Response filed Jun. 22, 2011 to Final Office Action Mailed Apr. 6, 2011", 9 pgs.

"Chinese Application No. 200680048771.1, Second Office Action mailed Jun. 14, 2011", (w/ English Translation), 8 pgs.

* cited by examiner

POWER GENERATOR SHUT-OFF VALVE

This application claims the benefit of U.S. Provisional Patent Application Ser. No. 60/698,457, filed Jul. 12, 2005, and U.S. Provisional Patent Application Ser. No. 60/757,823, filed Jan. 10, 2006.

BACKGROUND

In some fuel cell based power generators, hydrogen is extracted from a fuel in the presence of water and then is introduced into a fuel cell to produce electricity. In such generators, hydrogen may leak to ambient even when power is not being drawn from the power generator. As hydrogen is lost, water migrates back to the fuel to replace the water consumed by the reaction that produced the hydrogen. If this process continues, energy may be slowly drained from a power generator, reducing the total energy available from the power generator for useful power generation.

Many such power hydrogen fuel based generators are thought to involve complex fuel processing, and require components which occupy significant volume. Such power generators may be limited to comparatively large, high power applications. There is currently a need in the art for lighter weight and smaller sized power sources for applications such as portable electronic devices, wireless sensors, battlefield applications, and unmanned air vehicles. Such power sources should have a relatively long shelf life when not in use. It is desirable to increase the energy capacity of current power sources so as to decrease power supply replacement intervals and/or increase operating life, while also reducing the size and weight of the power source.

SUMMARY

A power generator has a hydrogen producing fuel and a fuel cell having a proton exchange membrane separating the hydrogen producing fuel from ambient. A valve is disposed between the fuel cell and ambient such that water is controllably prevented from entering the fuel cell by actuation of the valve. In one embodiment, multiple fuel cells are arranged in a circle around the fuel, and the valve is a rotatable ring shaped gate valve having multiple openings corresponding to the fuel cells.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

An electrical power generator is provided which generates hydrogen gas internally through the reaction of water vapor with a moisture absorbing, solid fuel substance, which hydrogen gas is reacted with atmospheric oxygen from the air at a fuel cell to generate electrical energy. The reaction of hydrogen and oxygen also produces water molecules as a byproduct at the fuel cell. This generated water is passively diffused from the fuel cell as water vapor to a fuel chamber that contains the solid fuel substance, where it reacts with the fuel substance to generate hydrogen gas. The electrical energy generated may be used to power large or small devices that are connected to the power generator, depending on the size of the power generator. The power generator of the invention is particularly useful for powering miniature devices such as wireless sensors, cellular phones or other hand held electronic devices that are electrically connected to the anode and cathode of the one or more fuel cells of the power generator.

Figure 1:
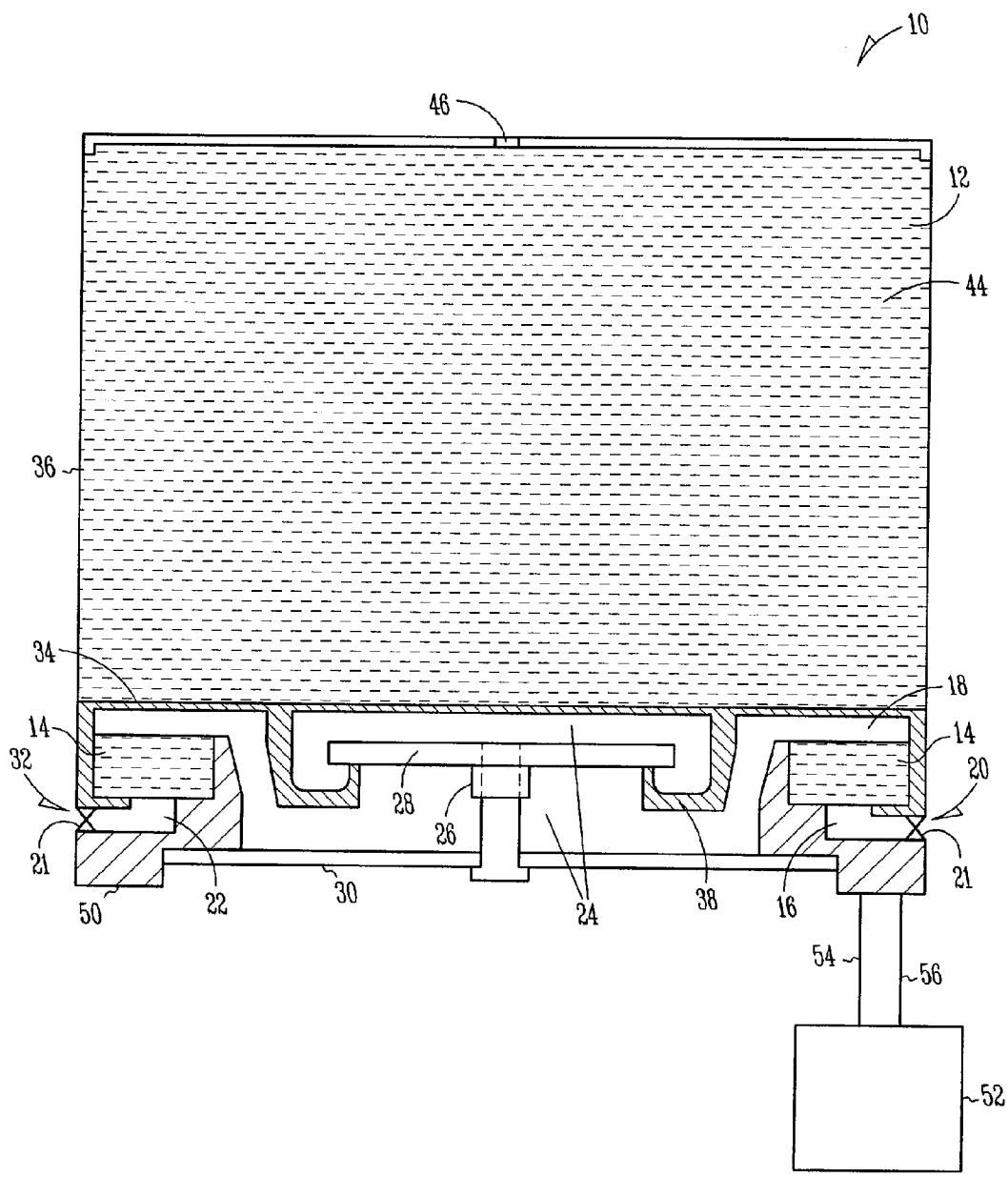
FIG. 1 is a cross-sectional schematic representation of a power generator having a shutoff valve according to an example embodiment.
Figure 2:
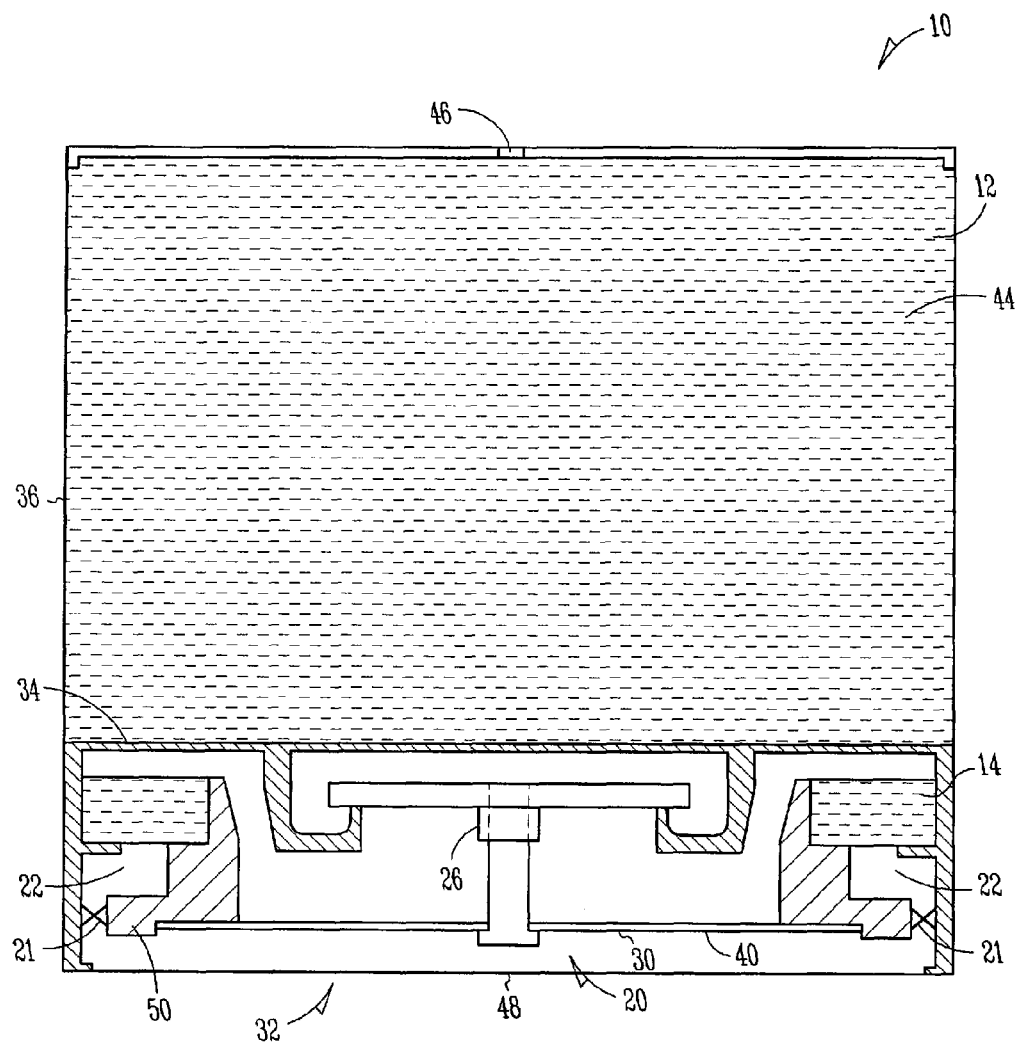
FIG. 2 is a cross-sectional schematic representation of an alternative power generator having a shutoff valve according to an example embodiment.

FIGS. 1 and 2 illustrate cross-sectional views of alternate power generator apparatuses for carrying out the process of the invention. As seen in FIG. 1 and FIG. 2, an electrical power generator 10 comprises a housing 36, at least one fuel cell 14 mounted within the housing 36, at least one fuel chamber 12 for storing a fuel substance 44 mounted with the housing 36, and a cavity 24 within the housing 36 extending from the at least one fuel cell 14 to the fuel chamber 12. Cavity 24 admits a flow of hydrogen gas from the fuel chamber 12 to the fuel cell 14, and admits a flow of water vapor from the fuel cell 14 to the fuel chamber 12. Fuel cell 14 generates electricity and fuel cell water from the reaction of hydrogen gas and oxygen gas from the air. Atmospheric oxygen enters into the housing 36 through at least one air inlet 20. The oxygen gas then travels to the fuel cell 14 where it reacts with hydrogen gas, generating electricity and water molecules. The type of fuel cell is referred to as a Proton Exchange Membrane (PEM) fuel cell, also known as a Polymer Electrolyte Membrane fuel cell.

Figure 3A:
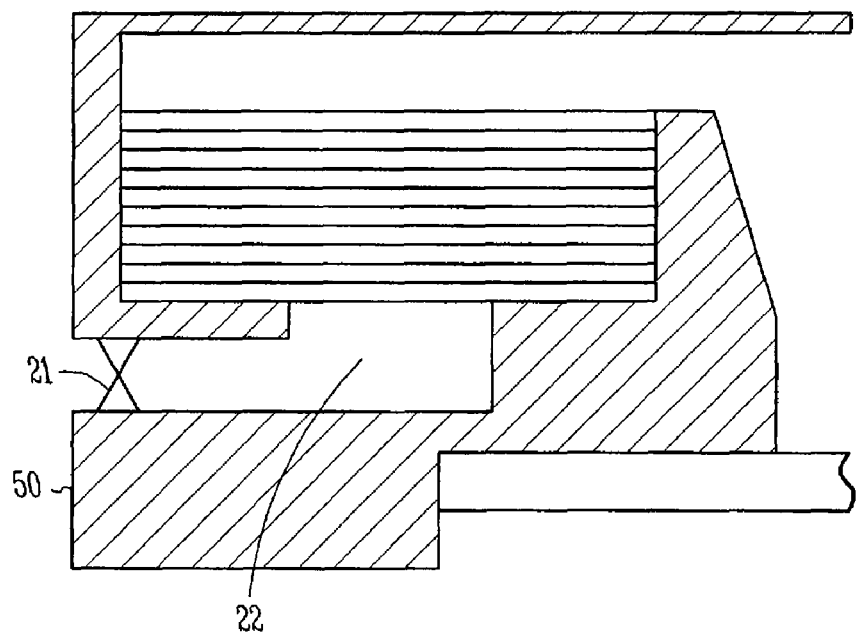
FIG. 3A is a cross-sectional schematic representation of a corner of the power generator illustrated in FIG. 1 according to an example embodiment.
Figure 3B:
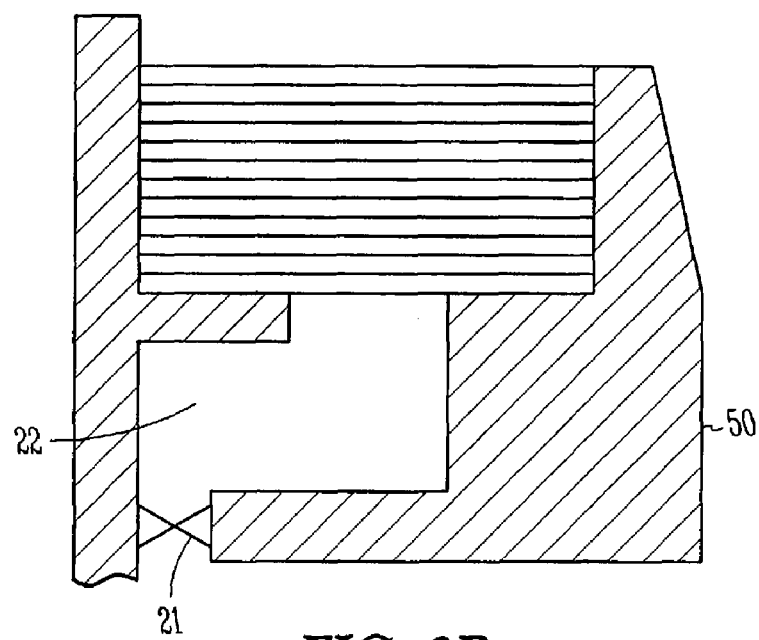
FIG. 3B is a cross-sectional schematic representation of a corner of the power generator illustrated in FIG. 2 according to an example embodiment.

In one embodiment, each air inlet 20 is formed in a shape that is suitable for inclusion of a shutoff valve 21. As such, the air inlets 20 may be rectangular or circular in shape, consistent with requirement of mating with the shutoff valve 21. The shutoff valve is also shown in FIGS. 2, 3A, and 3B. Further detail of the shutoff valve is shown at 600 in FIG. 6. The shutoff valve 21 may be operated to shutoff the fuel cell from all ambient water, effectively shutting down the fuel cell and stopping it from producing electricity and using up its fuel when not in use. The valve may be manually operated, or otherwise controlled as desired. In one embodiment, each air inlet 20 is formed with the shutoff valve, which may also be used to controllable limit the flow of ambient water to the fuel in further embodiments, as well as to shut off such flow completely.

Figure 4:
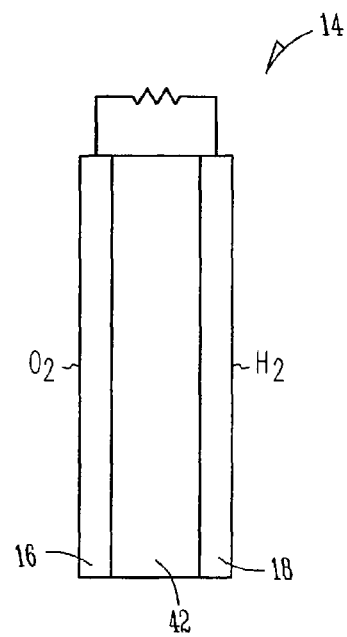
FIG. 4 is a schematic representation of a fuel cell having a shutoff valve according to an example embodiment.

As seen in FIG. 4, a typical PEM fuel cell comprises an electrolytic membrane 42 positioned between a positive electrode, or cathode 16, on one side of the membrane, and a negative electrode, or anode 18, on the other side of the membrane. In typical hydrogen-oxygen PEM fuel cell behavior, a hydrogen fuel (e.g. hydrogen gas) is channeled through flow field plates to the anode, while oxygen is channeled to the cathode of the fuel cell. At the anode, the hydrogen is split into positive hydrogen ions (protons) and negatively charged electrons. The electrolytic membrane allows only the positively charged ions to pass through it to the cathode. The negatively charged electrons must instead travel along an external circuit to the cathode, creating an electrical current. At the cathode, the electrons and positively charged hydrogen ions combine with oxygen to form water molecules.

Inside the generator, on the anode 18 side of the fuel cell, an initial flush of hydrogen or nitrogen gas is provided to remove residual oxygen from within the power generator. The purpose of this hydrogen or nitrogen flush is to remove residual oxygen from the anode of the power generator, thereby preventing a potentially explosive mixture of hydrogen and oxygen from developing inside the power generator, where it could easily be ignited by the catalyst on the fuel cell anode. Alternately, the generator may be initiated by the permeation of water molecules from the humidity of the atmosphere outside the power generator, through the air inlet 20, and into the power generator. It is also possible to add an initial amount of non-fuel cell water to the generator, in an amount substantially less than the amount of fuel cell water generated by the fuel cell, to react with the fuel substance 44 and initiate hydrogen gas generation. Such start-up water may be added to the generator, for example, through an opening in the fuel chamber 12, such as entry 46, or through another suitable means, such as through air inlet 20. However, the process and apparatus of the invention are designed to operate without an externally provided water supply, i.e. the system is water-less except for water that is generated by the fuel cell and water molecules present in the atmosphere outside of the power generator. There is no incorporated or connected water supply, such as a water chamber or water reservoir, to provide water for reaction with the hydrogen fuel substance. The result of which is a significant improvement in the energy density and specific energy of the power generator compared to conventional systems. Accordingly, the present invention provides a continuous, self-regulating process since the hydrogen-oxygen reaction produces exactly the required water corresponding to the electrical power generated, wherein stoichiometric amounts of recycled water and solid fuel are used.

The process may be passive, running without actively controlled valves or pumps. More particularly, once water is formed as a by-product of the oxygen-hydrogen reaction at the fuel cell 14, the produced water passively diffuses back through the fuel cell 14, into the cavity 24 and to the fuel chamber 12. This passive diffusion is enabled in part due to one or more water retention zones 22, in part due to the low humidity inside the cavity 24, as well as the construction of the fuel cell stack. Water retention zone 22 is highlighted by FIGS. 3A and 3B which offer corner views of the power generators illustrated in FIGS. 1 and 2. As used herein, and as shown in FIGS. 3A and 3B, a water retention zone 22 comprises the channel extending from the air inlet 20 to each the fuel cell cathode 16. A water retention zone 22 is present at each fuel cell 14 which generates fuel cell water. Due to the geometry of the water retention zone 22, diffusive water loss of fuel cell generated water molecules out of the air inlet is deterred, thereby maintaining a high concentration of water vapor at the fuel cell cathode 16. Instead of losing water molecules to the ambient air, water retention zone 22 causes generated water molecules to accumulate at the cathode 16, creating a region of high humidity between the cathode 16 and air inlet 20. This molar flow rate can be described with more specificity via the equation below:

$$J_A = \frac{D_{AB} * (P_{A1} - P_{A2})}{R * T * (Z_2 - Z_1)}$$

The transport of water vapor from the cathode 16 to the ambient air, and the transport of oxygen from the ambient air to the cathode 16 are both diffusion controlled processes. The molar flux, or molar flow rate, of A is $J_A$, where A is the desired species, i.e. either water or oxygen. The molar flux of water or oxygen is a function of the diffusivity $D_{AB}$, the partial pressure difference between point 1 and point 2 ($P_{A1}$-$P_{A2}$), the gas constant R, the temperature T in Kelvin, and the distance between points 1 and 2 ($Z_2$-$Z_1$). Additionally, flux is defined as per area, with units of $$\frac{\text{kg } A}{\text{m}^2 \text{ sec}} \text{ (kilograms of } A\text{, per m}^2 \text{ second).}$$

The diffusion coefficient is the proportionality constant between the flux of a species to its concentration gradient. The diffusion coefficient $D_{AB}$ refers to the diffusion coefficient of species A in species B. In the present case, it refers to the diffusion coefficient of water vapor in air, or the diffusion coefficient of oxygen in air. A large diffusion coefficient will yield a large flux value, and a small diffusion coefficient will yield a small flux value. The diffusion coefficient for oxygen in air is about 0.21 $cm^2$/sec at room temperature and normal room humidity, while the diffusion coefficient for water vapor in air at room temperature and humidity is about 0.24 $cm^2$/sec.

Partial pressure is the fraction of the total pressure of a mixture of gases that is due to one component of the mixture. A large partial pressure difference will generate a relatively large flux of the species, while a small partial pressure difference will generate a relatively small flux. The water retention zone is designed to give a small partial pressure difference, e.g. about 10% to about 20% of atmospheric oxygen partial pressure, to obtain the oxygen flux required for the desired power level.

The gas constant is a product of Boltzmann's constant and Avogadro's number. The temperature in Kelvin affects the flux of the species of interest. Higher temperatures tend to reduce flux, while lower temperatures tend to increase flux. Thus, the diffusion of gases, and by extension, their partial pressure differences, can be controlled by adjusting the channel geometry.

The power generators as seen in FIGS. 1 and 2 are designed to allow enough oxygen to diffuse from the ambient air, through the air inlet 20 and to the cathode 16 with only a small pressure drop, e.g. 10% to 20% of the atmospheric oxygen pressure. The power generator may have high hydrogen permeation losses and thus reduced lifetime if operated at high pressures.

The chemical reaction that converts hydrogen and oxygen to water ($2H_2+O_2 \rightarrow 2H_2O$) creates two moles of water for every mole of oxygen it consumes. Further, the diffusivity of water vapor in air and the diffusivity of oxygen in air are similar. Accordingly, the partial pressure difference of water vapor must be roughly twice that of oxygen to maintain equilibrium. Therefore, the power generator of the invention having the above proportions maintains a humidified environment instead of losing the generated water molecules to the atmosphere outside the generator.

Within the cavity 24, on the anode 18 side of the fuel cell 14, a comparatively low humidity region exists due to the moisture absorbing, hygroscopic nature of the fuel substance 44. Accordingly, the water generation and retention at the cathode 16 generates a moisture concentration gradient and a gas pressure differential which causes water molecules to diffuse back through the fuel cell 14, into the cavity 24 and to the fuel chamber 12 in the form of water vapor. This water vapor then reacts with fuel substance 44, generating hydrogen gas. The generated hydrogen gas will then pass through cavity 24 and to the fuel cell anode 18 where it will react with oxygen to once again generate water molecules. This cycle may optionally continue until all of the fuel substance 44 is consumed.

During operation of the power generator, more generated water vapor will diffuse back into the cavity than is lost out of the air inlet. Furthermore, fuel cell output is directly dependent on the flow of oxygen and hydrogen reactants to the fuel cells, and hence the flow of water vapor to the fuel chamber. Accordingly, fuel cell output is proportional to the ratio of the area of the water retention zone to its length. In an embodiment of the invention, the ratio of zone area to zone length per unit of power is from about 0.01 cm/mW to about 0.05 cm/mW of power output for a single fuel cell in one embodiment. If multiple fuel cells are incorporated, this ratio of zone area to zone length per unit of power is divided by the number of fuel cells which share the reactants.

The generator will operate at reduced power if the geometry of the water retention zone 22 is too restrictive to allow sufficient oxygen to diffuse to the fuel cells 14. Particularly, at a zone area to length ratio of greater than 0.05 $cm^2$ area/1 cm length, excess water vapor will diffuse out of the air inlet, and at a zone area to length ratio of less than 0.01 $cm^2$ area/1 cm length, not enough oxygen will reach the fuel cells to operate at a high efficiency. The same is true for the geometry of the cavity within the housing extending from the fuel cell to the fuel chamber, which admits a flow of hydrogen gas from the fuel chamber to the fuel cell, and which admits a flow of water vapor from the fuel cell to the fuel chamber.

In another embodiment, the power generator 10 may further include at least one valve 26 for regulating the flow hydrogen gas from the fuel chamber 12 to the fuel cell 14, and for regulating the passage of water vapor from the fuel cell 14 to the fuel chamber 12. As shown in FIGS. 1 and 2, valve 26 is positioned within the cavity 24 between fuel chamber 12 and the fuel cell 14. In an embodiment of the invention, valve 26 comprises a pneumatic valve that is controlled by gas pressure within said cavity 24, pneumatically adjusting the conductance of water vapor to the fuel chamber 12. In one embodiment, valve 26 comprises a pneumatically actuated flexible diaphragm 30 having a periphery that may be fixed to the power generator housing 36 at a support 50; a valve disc 28 positioned opposite the diaphragm 30; and a rod connector joins the valve disc 28 and diaphragm 30. The valve 26 is in a closed position when the valve disc 28 is in contact with a seal 38, preventing water vapor from reaching the fuel chamber 12. Alternately, the valve is in an open position when the valve disc is separated from seal 38, allowing water vapor to reach the fuel chamber 12 and allowing generated hydrogen gas to reach the fuel cells 14. Seal 38 may comprise a portion of housing 36. Support 50 also may comprise part of housing 36. As seen in FIGS. 1 and 2, the fuel cell or fuel cells 14 may also be mounted inside the housing by support 50.

The dimensions of the component parts of the valve may be very small in scale but may vary with respect to the particular application of the valve. The diaphragm thickness and diameter should be within a certain range depending on the desired power output. In one embodiment of the invention, the diaphragm 30 comprises a thin circular plate having a diameter of from about 1 cm to about 3 cm, or from about 1 cm to about 2 cm. The valve disc 28 may have a diameter of from about 0.2 to about 1 cm, or may be from about 0.2 cm to about 0.5 cm. In one embodiment of the invention, the rod connector may comprise a screw or a bolt, but any other means of connecting the diaphragm 30 to the valve disc 28 is suitable such that the valve can alternate between the open and closed positions.

The actuation of the valve may be controlled by the internal gas pressure exerted on the diaphragm 30. As the internal gas pressure of the apparatus rises due to the generation of hydrogen gas, the diaphragm 30 will bend or push outward slightly. This causes the connector to pull the valve disc 28 against the seal 38, closing the valve and preventing the flow of additional water vapor to the fuel chamber 12. With the valve closed, hydrogen production ceases. This also prevents the internal gas pressure from rising further. As hydrogen is consumed, such as by fuel cells 14, the internal gas pressure drops, allowing the valve disc 28 to disengage the seal 38 and opening the valve. Accordingly, hydrogen gas is automatically produced at the rate at which it is consumed.

In one embodiment of the invention, the power generator 10 operates by maintaining a fixed pressure, via the pneumatic valve 26. The power generator 10 should be able to operate down to low ambient pressures at reduced power output, and up to theoretically unlimited ambient pressures at full power output. In an embodiment of the invention, the internal $H_2$ pressure of the apparatus when in the closed position is from about 0 kPa to about 1000 kPa. The valve will be fully shut when no hydrogen gas is used by the fuel cell, and will open the amount required to meet consumption rate of the hydrogen gas. In one embodiment of the invention, the internal pressure of the power generator is maintained at about 100 kPa at all times, wherein when the pressure drops below about 10 kPa, the valve will open slightly until the internal pressure raises to at or above about 500 kPa, causing the valve to close. Operating pressures may be from about 0.5 atm (about 50 kPa) to about 2 atm (about 202 kPa) for small scale applications such as portable electronic devices or wireless sensors.

In general, the power generator 10 operates by maintaining a fixed pressure, usually a few psi over ambient, using the pneumatic valve 26. In one embodiment, generator 10 is able to operate down to low ambient pressures at reduced power output, and up to theoretically unlimited ambient pressures at full power output.

The power generator 10 may be maintained at an operating temperature of from about −40° C. to about 85° C., or in a further embodiment, from about −20° C. to about 50° C., or from about 0° C. to about 50° C. or from about 20° C. to about 50° C. while in use.

For the purposes of this invention, the term "water vapor" does not include steam. While "water vapor" and "steam" are both forms of water, each has very different properties and uses. For example, a locomotive can be driven by steam, but will not operate on the water vapor present in humid air, as does the present invention. In and of itself, "water vapor" is the gas of individual water molecules that may form naturally over a body of water at any temperature, including ice, or that may be naturally present in ambient air. It has a low partial pressure, so it contains relatively few water molecules unless the water that forms it is heated. On the other hand, "steam" is made up of tiny hot water droplets produced by heating water to boiling. Steam contains about 100× more water molecules than does water vapor at 15° C., naturally expands with high force and velocity, and large amounts of water can be boiled and transported off as steam. Water vapor is present in everyday air and contains a much smaller number of water molecules than steam or liquid water, and moves very slowly by natural diffusion. Only very small amounts of water can be transported in the form of water vapor. To illustrate, a single drop of water takes typically one hour to evaporate at room temperature, while an entire kettle of water can be boiled into steam in about twenty minutes. Further, a steam powered generator would require a water supply or water source from which steam may be generated. In contrast, the present invention provides an improvement upon the related art by eliminating such a water source. Accordingly, the apparatus and process of the present invention are designed to function at low operating temperatures using water vapor, not at high operation temperatures using steam.

As seen in FIGS. 1 and 2, the power generator 10 may further include a restriction 32 united with the air inlet 20, regulating the diffusion of atmospheric oxygen and atmospheric water molecules into the power generator. This restriction also aids in raising the humidity at the fuel cell cathode 16 due to impedance presented to outward diffusion of water vapor produced at the cathode 16. This increased humidity improves the operation of the fuel cell. The restriction comprises a hydrophobic membrane that is substantially permeable to atmospheric oxygen gas, but substantially impermeable to water vapor, which membrane substantially obstructs the flow of fuel cell water into the atmosphere. Suitable materials for this oxygen permeable, water vapor impermeable membrane having the desired properties include fluoropolymer containing materials such as fluorinated ethylene propylene (FEP), perfluoroalkoxy, and non-fluoropolymer containing materials such as oriented polypropylene (OPP), low density polyethylene (LDPE), high density polyethylene (HDPE) and cyclic olefin copolymers (COCs). One oxygen permeable, water vapor impermeable membrane material comprises fluorinated ethylene propylene. In addition, for some embodiments, the membrane alone may not allow sufficient oxygen permeation to the cathode. Accordingly, a small opening 48 (see FIG. 2) in the restriction 32 may be provided to allow the ingress of extra atmospheric oxygen and atmospheric water molecules into the cavity to diffuse to the fuel cell cathode or cathodes. However, this opening may also cause some of the water vapor to diffuse out of the power generator 10. The required opening size is a function of the power level, the diffusion path length, and the desired partial pressure drop. The size of this opening is very small in size and may comprise from about 0.001% to about 1% of the entire surface area of the membrane.

The substantially non-fluid substance within the fuel chamber 12 may comprise a material in powder, granule or pellet form and may be an alkali metal, calcium hydride, lithium hydride, lithium aluminum hydride, lithium borohydride, sodium borohydride and combinations thereof. Suitable alkali metals non-exclusively include lithium, sodium and potassium. One material for the non-fluid substance is lithium aluminum hydride. The fuel substance may be a solid, porous material that allows for the diffusion of gases and vapors. Further, the non-fluid substance may also be combined with a hydrogen generation catalyst to catalyze the reaction of the water vapor and the non-fluid substance. Suitable catalysts include non-exclusively include cobalt, nickel, ruthenium, magnesium and alloys and combinations thereof.

As seen in FIGS. 1 and 2, fuel chamber 12 may be bordered by porous vapor membrane 34. This membrane 34, attached to the housing 36 and juxtaposed with the fuel chamber 12, is necessarily permeable to water vapor, so as to allow water vapor to pass into the fuel chamber 12 and react with the solid fuel substance, thereby generating hydrogen gas. It is also necessarily permeable to hydrogen gas, so as to allow generated hydrogen gas to pass into the cavity 24 and back to the fuel cell 14. Suitable materials for this vapor membrane 34 having such dual properties non-exclusively include porous polymers including fluoropolymers, including expanded-polytetrafluoroethylene (ePTFE) laminates such as expanded Teflon®. Example ePTFE laminates are GORE-TEX® manufactured by W. L. Gore & Associates, Inc. of Delaware, and eVENT®, manufactured by BHA technologies of Delaware.

Referring to FIG. 2, in particular, is a cross-sectional schematic representation of an alternate power generator of the invention having an air inlet with a larger surface area compared to the generator of FIG. 1. Similarly, in this embodiment, a hydrophobic membrane 32 that is substantially permeable to atmospheric oxygen gas, but substantially impermeable to water vapor, may be placed at air inlet 20. However, in order to allow for the intake of water molecules from natural air humidity in the atmosphere, a small opening 48 (e.g. about 0.008 cm$^2$) opening may be cut into the membrane 32. This opening 48 will also allow extra oxygen to diffuse to the fuel cell cathodes. In an embodiment of the invention, the power generators of the invention will perform best when in an environment having a relative humidity of at least about 5%, wherein the performance will improve with increasing humidity.

The embodiment of FIG. 2 may includes a pneumatic valve 26 which may include a mesh diaphragm 30 and a water permeable, hydrogen impermeable membrane 40 in juxtaposition with the mesh diaphragm 30 of the valve 26. The mesh diaphragm 30 may be permeable to water vapor and may be formed from a polymeric material, such as polyethylene terephthalate or a metal such as stainless steel. Suitable water permeable materials for this water permeable membrane 40 include perfluorinated polymers such as perfluorosulfonate ionomers. Also suitable are epoxides and chloroprene rubber. The water permeable membrane may comprise a perfluorosulfonate ionomer membrane commercially available under the trademark Nafion® from EI DuPont de Nemours & Co. of Delaware. Nafion® may be used in one embodiment because it has a fluorinated backbone that makes it very stable, with sulfonic acid side chains to support high ionic conductivity. The water permeable, hydrogen impermeable membrane 40 allows the diffusion of water vapor to the fuel chamber 12 without passing the water vapor through the electrolytic membrane 42. It provides a large area path for water vapor to permeate into the fuel chamber and may allow the fuel cells 14 to operate at higher current densities than if the water is recovered solely though the fuel cells themselves. A similar material forms the electrolytic membrane 42 of the at least one fuel cell 14.

Accordingly, as can from FIG. 2, this power generator 10 provides dual avenues for the transport of fuel cell generated water molecules from the fuel cell cathode 16 to the fuel chamber 12. Specifically, in the embodiment of FIG. 2, the reaction of hydrogen gas and atmospheric oxygen in the fuel cell 14 results in the generation of fuel cell water at the fuel cell cathode 16, and thereby generates electricity. This generated fuel cell water is retained in the water retention zone 22 and may re-enter cavity 24 by either diffusing back through the fuel cell 14, or by diffusing from the water retention zone 22 and permeating through the mesh diaphragm 30 and water permeable membrane 40.

Figure 5:
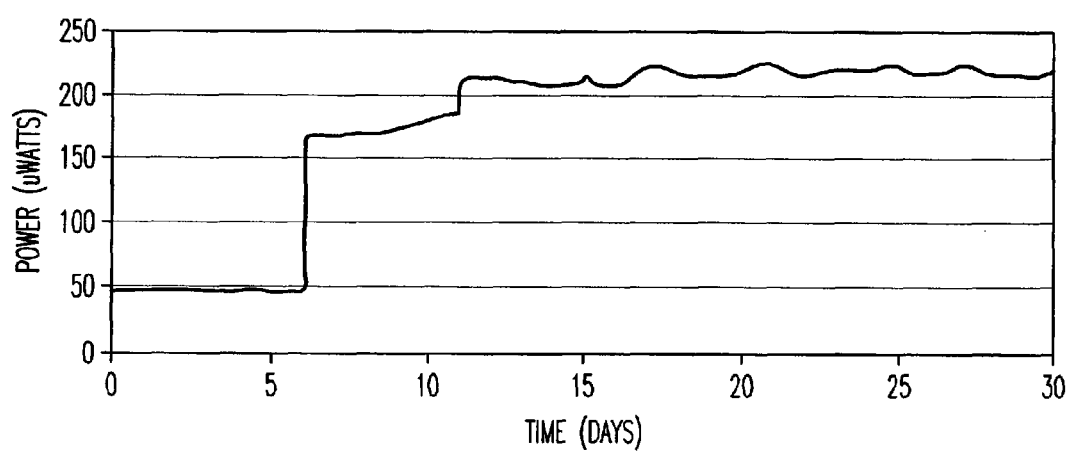
FIG. 5 is a plot of power output versus time for a power generator according to an example embodiment.

FIG. 5 offers an example of the power output vs. time plot for a small-scale, micro-power generator of the invention. A micro-power generator of the invention may produce a power output of from about 1 micro Watt to about 100 milli Watts, or from about 1 micro Watt to about 1000 milli Watts, and energy densities of from about 0.1 W-hr/cc to about 10 W-hr/cc in various embodiments. Larger power generators of the invention may produce power output levels of from about 0.1 W to about 100 W and energy densities of from about 0.1 W-hr/cc to about 10 W-hr/cc.

Figure 6:
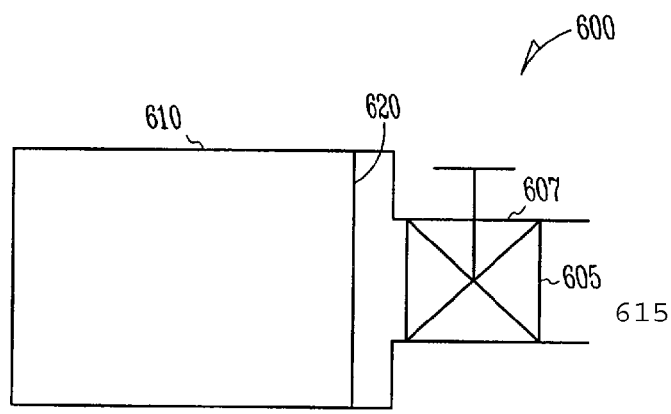
FIG. 6 is a schematic representation of an inlet from the power cell to ambient illustrating the position of a shutoff valve according to an example embodiment.

FIG. 6 illustrates an example fuel cell 600 with a valve 605 in a channel or opening 607 that may be used between fuel 610 and ambient 615 to prevent water from ambient from reaching the fuel when the fuel cell is not in use. In one embodiment, the valve 605 is positioned in an opening leading between ambient and a PEM membrane 620. The valve may be manually operated, or may be closed using power from the fuel cell. Such valve could be operated automatically with an electrostatic, pneumatic, piezoelectric, or magenetic (solenoid) actuator. In one embodiment, the valve is a gate valve. In further embodiments, the valve may be a globe value, gate valve, butterfly valve, ball valve, or other type of valve.

Fuel cell 600 does not need to include the regulating values illustrated in prior embodiments. It may be a simple fuel cell with hydrogen producing fuel 610, and a PEM membrane 620 that is exposed to ambient 615 on one side and hydrogen produced by the fuel 610.

In further embodiments, the shutoff valve 605 comprises a diaphragm that may be moved electrostatically between an open and closed position. In yet a further embodiment, it may be threaded member that mates with corresponding threads in the opening 607. To open the valve, the threaded member is unscrewed. To close the valve, the threaded member may be screwed back in place. In one embodiment, the valve provides a hermetic seal when closed.

Figure 7:
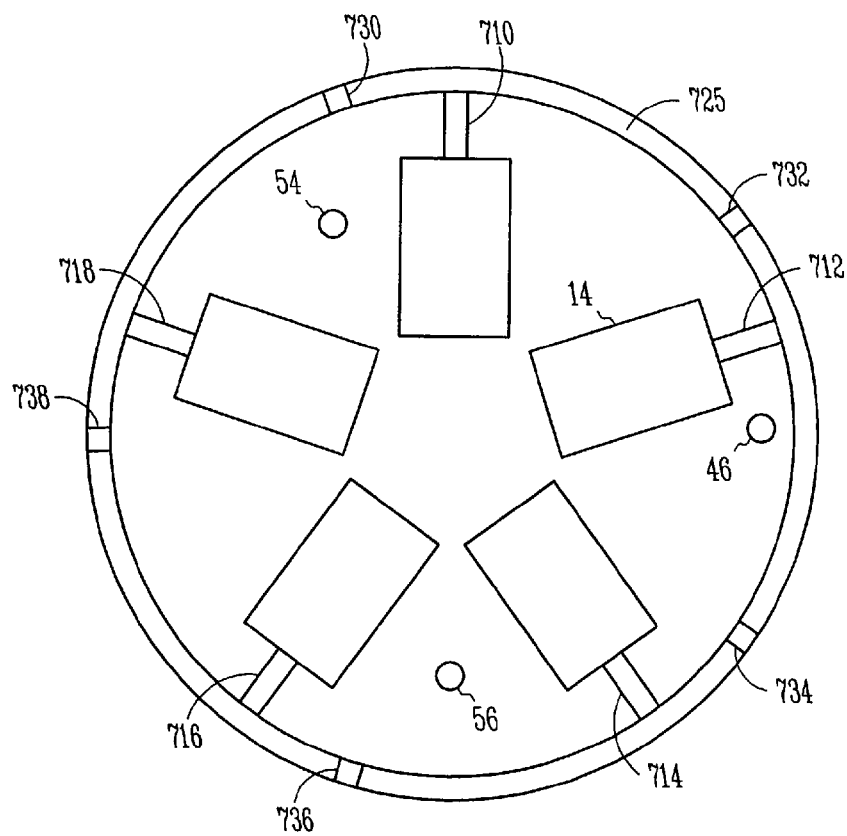
FIG. 7 is a partial cross sectional view of a cylindrical power generator incorporating a plurality of fuel cells according to an example embodiment.

Illustrated in FIG. 7 is a partial cross sectional view of a cylindrical power generator 10 of the invention having a plurality of fuel cells. As seen in FIG. 7, in one embodiment, a plurality of fuel cells 14 are positioned around a circumference of the power generator 10. The number of fuel cells 14 may be varied, such as 5 as shown, or 8. Fewer or more fuel cells 14 may be used. A power generator 10 of the invention may also include an entry 46, through which fuel substance 44 may optionally be replenished. Alternately, when fuel substance 44 is consumed, the power generator may be disposed, similar to a battery. Each of the assembled component parts of the power generator 10 may further be enclosed in a suitable hollow structure such as a tube formed from a suitable material, such as polyethylene terephthalate (not shown), which enclosure may also be capped on the top and/or bottom surfaces with a suitable cap (not shown), which cap may be removable and may be formed of a similar or different material as the enclosure. The power generator 10 also may include at least one electrical connector through which a device may be electrically connected to the power generator 10. As illustrated in FIG. 1, in an embodiment of the invention, a device 52 (schematically represented, not drawn to scale) may be electrically connected to the power generator 10 through electrical connectors 54 and 56, which electrical connectors 54 and 56 may be connected to the cathode(s) and anode(s) of the fuel cell(s).

Electrical connectors 54 and 56 are also illustrated in FIG. 7. In embodiments incorporating a plurality of fuel cells, the plurality of fuel cells may be connected in series, and may be connected to a single set of electrical connectors 54 and 56 protruding from the generator housing 36. In one embodiment of the invention, the power generator 10 includes eight interconnected fuel cells.

Each of the parts of the power generator 10 and the valve 26 may be fabricated of a suitable polymeric material, a metal or other material as determined by the requirements of the intended use of the generator and valve. One example material non-exclusively includes polyethylene terephthalate. Dimensions of the component parts of the power generator 10 may be very small in scale, but may also vary with respect to the use of the power generator 10. Outer dimensions of such a waterless, micro-power generator are from about 1 mm to about 100 mm in length, from about 1 mm to about 100 mm in width, and from about 1 to about 100 mm in depth, or in a further embodiment, from about 1 mm to about 25 mm in length, from about 1 mm to about 25 mm in width, and from about 1 to about 25 mm in depth. Such a waterless, micro-power generator is capable of incorporating one or more fuel cells 14 which fuel cells may range in size from about 0.1 $mm^2$ to about 5,000 $mm^2$. A waterless, micro-power generator of the invention may also be capable of containing a volume capacity of from about 0.1 $mm^3$ to about 15,625 $cm^3$. A larger power generator may have dimensions of up to at least about 50 cm or more in length, width and depth, up to at least about 5000 $cm^2$ or more in fuel cell area and up to at least about 0.125 $m^3$ or more in power generator volume. While these dimensions are used in one embodiment, they may vary widely and are not intended to be limiting. The dimensions of each of the component parts of the power generator may similarly vary as could be determined by one skilled in the art in such a manner that the power generator of the invention will operate as intended.

In FIG. 7, channels 710, 712, 714, 716, and 718 to each of the fuel cells provide access to ambient. A rotatable ring 725 or multi-opening gate valve having corresponding openings 730, 732, 734, 736, and 738 provide a shutoff valve function, such as a to each of the fuel cells by rotating the ring 725 with respect to the channels such that the openings and channels do not line up, as shown in FIG. 7. Rotating the ring 725 to line up the openings and channels provide access of the fuel cells to ambient, to provide additional water, such as in the form of water vapor to allow the fuel cells to resume producing electricity.

Figure 8:
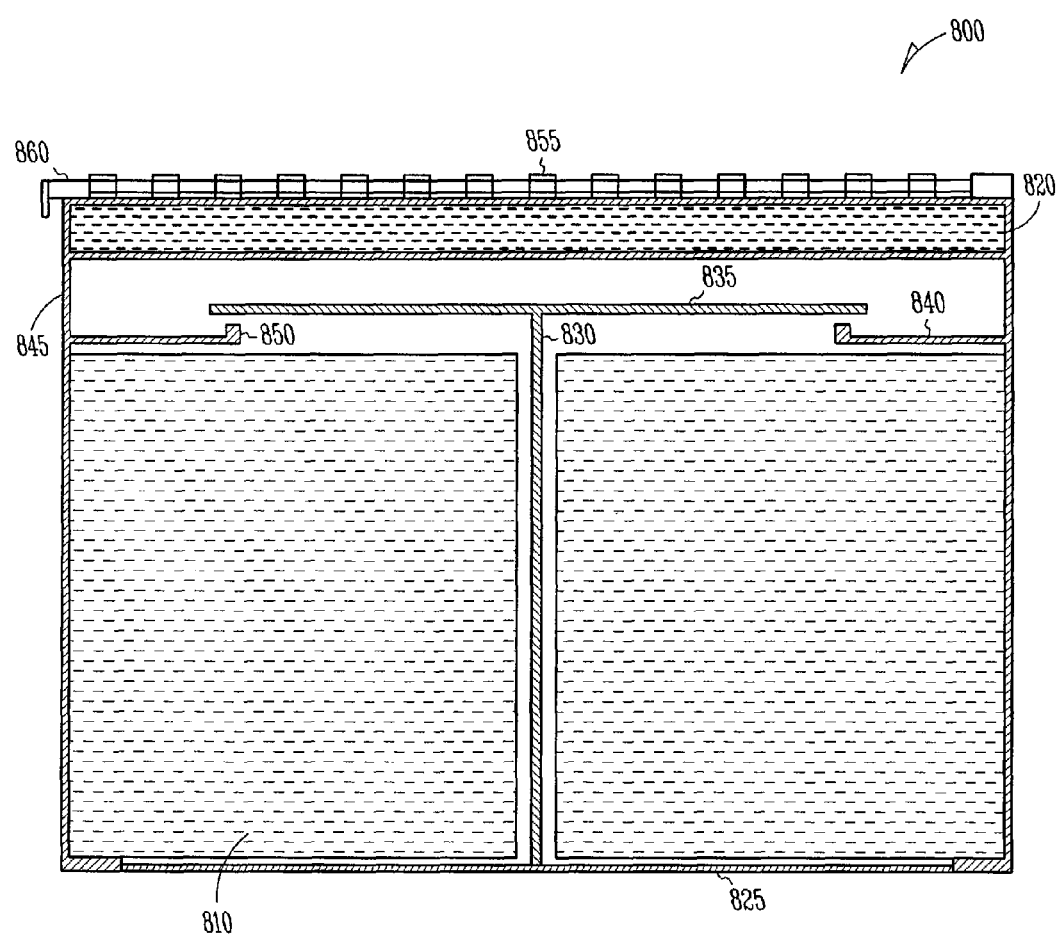
FIG. 8 is a cross sectional view of an alternative power generator having a shut off valve.

FIG. 8 is a cross section of an alternative power generator 800, having a hydrogen producing fuel 810 and a proton exchange membrane based fuel cell 820 that is controllably exposed to ambient and hydrogen produced by the fuel 810. Fuel cell 820 may comprise one or more fuel cells in one or more layers in various embodiments. In one embodiment, a pressure regulated valve is disposed between the hydrogen producing fuel 810 and the fuel cell 820. The valve consists of a pressure responsive flexible diaphragm 825 disposed on a first side of the hydrogen producing fuel, and a piston or stem 830 connecting a valve plate 835 for seating on a plate 840. Plate 840 may be coupled to a power generator container 845 and have an annular seat ring 850 for making a sealing contact with the valve plate 835

In a further embodiment, a slide valve 855 or other type of valve is coupled between the fuel cell 820 and ambient. An actuator such as a slide valve actuator 860 is coupled to the slide valve 855 for moving the valve between an open position, allowing oxygen from ambient air or a controlled source to reach the fuel cell 820 and a closed position, which substantially if not fully prevents oxygen from reaching the fuel cell 820.

In one embodiment, the diaphragm 825 is designed with a spring constant sufficient to create a desired pressure of hydrogen between the fuel and the plate valve 840. The valve regulates water vapor diffusion between the fuel cells and the fuel. The spring constant of the valve thus determines the pressure difference between the inside of the power generator and the environment, also referred to as ambient.

It should be further understood that while several embodiments illustrating various structures have been described, such structures are not intended to be limiting. Other design variations that perform in a substantially similar manner, i.e. waterless power generators capable of producing useful levels of electricity with hydrogen-oxygen fuel cells including a solid fuel substance, are incorporated within the scope of the invention.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A power generator comprising:
   a hydrogen producing fuel;
   a fuel cell having a cathode, proton exchange member, and an anode positioned between the fuel and ambient;
   a pressure regulated valve disposed at a cavity extending from a membrane bordering the hydrogen producing fuel to the fuel cell, the pressure regulated valve to regulate exposure of the hydrogen producing fuel to water vapor from the fuel cell when pressure between the hydrogen producing fuel and fuel cell is below a predetermined level; and
   a second valve positioned, in a single passage configured for both inlet and outlet, between ambient and the cathode of the fuel cell, wherein a geometry of the single passage is proportioned to deter diffusive water loss and thereby form a water retention zone at the cathode of the fuel cell.

2. The power generator of claim 1 wherein the pressure regulated valve is coupled to a pressure responsive flexible diaphragm.

3. The power generator of claim 2 wherein the pressure regulated valve is coupled to a seat when pressure between the hydrogen producing fuel and fuel cell is above a predetermined level.

4. The power generator of claim 3 wherein the pressure regulated valve allows exposure of the hydrogen producing fuel to the fuel cell when pressure between the hydrogen producing fuel and fuel cell is below a predetermined level.

5. The power generator of claim 1 wherein the second valve is positioned between ambient and the fuel cell to selectively block a cathode of the fuel cell from ambient.

6. The power generator of claim 5 wherein the second valve comprises a gate valve, butterfly valve, or ball valve.

7. The power generator of claim 1 wherein the fuel cell comprises multiple fuel cells arranged in a ring, and wherein the second valve comprises a multi-opening gate valve.

8. The power generator of claim 7 wherein the multi-opening gate valve that is rotated to selectively expose or block the cathode to or from ambient.

* * * * *